US012652633B2

(12) United States Patent
Zeng et al.

(10) Patent No.: US 12,652,633 B2
(45) Date of Patent: Jun. 9, 2026

(54) RELIABILITY ASSURANCE METHOD AND RELATED APPARATUS

(71) Applicant: HUAWEI TECHNOLOGIES CO., LTD., Shenzhen (CN)

(72) Inventors: Zhengyang Zeng, Shanghai (CN); Feng Yu, Beijing (CN); Shikun Li, Shanghai (CN); Yuqiao Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 465 days.

(21) Appl. No.: 18/174,756

(22) Filed: Feb. 27, 2023

(65) Prior Publication Data

US 2023/0224838 A1     Jul. 13, 2023

Related U.S. Application Data

(63) Continuation of application No. PCT/CN2021/113663, filed on Aug. 20, 2021.

(30) Foreign Application Priority Data

Aug. 28, 2020    (CN) .......................... 202010886086.8

(51) Int. Cl.
*H04W 56/00*          (2009.01)
*H04L 43/0829*        (2022.01)

(52) U.S. Cl.
CPC ..... *H04W 56/003* (2013.01); *H04W 56/0055* (2013.01)

(58) Field of Classification Search
CPC ............................................... H04W 24/00–04
See application file for complete search history.

(56) References Cited

U.S. PATENT DOCUMENTS

| | | | | |
|---|---|---|---|---|
| 2014/0211780 A1* | 7/2014 | Kang | .................... | H04W 76/10 |
| | | | | 370/350 |
| 2014/0293799 A1* | 10/2014 | Park | .................... | H04L 41/5009 |
| | | | | 370/242 |
| 2015/0043330 A1* | 2/2015 | Hu | ........................ | H04L 49/557 |
| | | | | 370/225 |
| 2015/0092585 A1* | 4/2015 | Shao | .................... | H04L 47/283 |
| | | | | 370/252 |

(Continued)

FOREIGN PATENT DOCUMENTS

| | | |
|---|---|---|
| CN | 109788509 A | 5/2019 |
| CN | 111327392 A | 6/2020 |

(Continued)

OTHER PUBLICATIONS

Extended European Search Report issued in EP21860268.8, dated Nov. 23, 2023, 9 pages.

(Continued)

*Primary Examiner* — San Htun

(57)                ABSTRACT

The present disclosure provides a reliability assurance method and a related apparatus. A receiving end device (watchdog) detects a continuous packet loss state, and sends the continuous packet loss state to an access network device, so that the access network device adjusts differentiated scheduling and a reliability assurance policy based on the continuous packet loss state.

12 Claims, 8 Drawing Sheets

(56) References Cited

U.S. PATENT DOCUMENTS

| | | | |
|---|---|---|---|
| 2015/0223098 A1* | 8/2015 | Sze | H04L 43/0852 |
| | | | 370/235 |
| 2016/0219088 A1* | 7/2016 | Ma | H04L 65/765 |
| 2020/0275509 A1 | 8/2020 | Yu et al. | |
| 2021/0359778 A1* | 11/2021 | Wang | H04L 69/28 |

FOREIGN PATENT DOCUMENTS

| | | | |
|---|---|---|---|
| CN | 111327404 | A | 6/2020 |
| EP | 3697041 | A1 | 8/2020 |
| WO | 2019080656 | A1 | 5/2019 |
| WO | 2020089851 | A1 | 5/2020 |
| WO | 2020164356 | A1 | 8/2020 |
| WO | 2020167231 | A1 | 8/2020 |

OTHER PUBLICATIONS

Office Action issued in CN202010886086.8, dated Jun. 1, 2023, 8 pages.
Samsung, Enhancements to 5GS QoS framework for support of deterministic communication. SA WG2 Meeting #131, Feb. 25-Mar. 1, 2019, Santa Cruz-Tenerife, Spain, S2-1901928, 2 pages.
3GPP TS 23.501 V16.5.1 (Aug. 2020), 3rd Generation Partnership Project; Technical Specification Group Services and System Aspects; System architecture for the 5G System (5GS); Stage 2(Release 16), 440 pages.
3GPP TS 22.104 V17.3.0 (Jul. 2020), 3rd Generation Partnership Project; Technical Specification Group Services and System Aspects; Service requirements for cyber-physical control applications in vertical domains; Stage 1(Release 17), 76 pages.
International Search Report and Written Opinion issued in PCT/CN2021/113663, dated Nov. 18, 2021, 9 pages.

* cited by examiner

RELIABILITY ASSURANCE METHOD AND RELATED APPARATUS

CROSS-REFERENCE TO RELATED APPLICATIONS

This application is a continuation of International Application No. PCT/CN2021/113663, filed on Aug. 20, 2021, which claims priority to Chinese Patent Application No. 202010886086.8, filed on Aug. 28, 2020. The disclosures of the aforementioned applications are hereby incorporated by reference in their entireties.

TECHNICAL FIELD

Embodiments of the present disclosure relate to the communication field, and in particular, to a reliability assurance method and a related apparatus.

BACKGROUND

To improve reliability of a communication process, and ensure that a packet can be delivered within a given survival time, an application layer of an industrial communication protocol (for example, an industrial Ethernet Profinet or an Ethernet control automation technology EtherCAT) usually uses a reliability monitoring mechanism (watchdog mechanism, watchdog), to set a specific continuous packet loss quantity requirement for a packet of an application layer of an industrial communication user (industrial communication protocol device, for example, a PLC controller or an industrial personal computer), to require a continuous packet loss quantity of the packet to be less than a maximum threshold. When the continuous packet loss quantity reaches the threshold, an entire communication link is interrupted. It should be noted that if the watchdog does not receive an expected packet within a specified time window, it is considered that a packet loss occurs. The watchdog may be disposed at a receiving end.

In a wireless network (for example, the 3GPP) network, quality of service and a reliability assurance degree are set for a user to balance radio resource consumption and delay performance of the user. If the assurance degree is excessively high, spectral efficiency is excessively low, the radio resource consumption is excessively large, and a capacity of the entire wireless network is excessively low. Consequently, a multi-user access scenario cannot be met. If the assurance degree is excessively low, although an overall capacity is improved, because a plurality of times of retransmission cause a delay increase, a packet loss is caused in a scenario in which a packet has a receiving time window requirement.

How to match a proper assurance degree is a problem to be resolved urgently.

SUMMARY

Embodiments of the present disclosure provide a method and a related apparatus, so that in an industrial communication scenario, a wireless network (for example, the 3GPP) obtains continuous packet loss quantity information of a watchdog of an industrial communication user, and differentiated scheduling and reliability assurance are performed in the wireless network.

According to a first aspect of the present disclosure, a reliability assurance method is provided, including:

A receiving end device (watchdog) detects a continuous packet loss state, where the continuous packet loss state indicates a current packet loss state of data transmission between a transmitting end device and the receiving end device, and both the transmitting end device and the receiving end device are industrial communication terminal devices; and the receiving end device sends the continuous packet loss state to an access network device, so that the access network device adjusts differentiated scheduling and a reliability assurance policy based on the continuous packet loss state.

Based on the foregoing method, the access network device may obtain the continuous packet loss state, and the access network device uses differentiated user quality and the reliability assurance policy, to balance an assurance effect and radio resource consumption.

Based on the first aspect of the present disclosure, in a first implementation of the first aspect of the present disclosure, after the receiving end device detects the continuous packet loss state, the receiving end device may send the continuous packet loss state to a core network device, so that the core network device adjusts the differentiated scheduling and the reliability assurance policy based on the continuous packet loss state.

In this embodiment of the present disclosure, the core network device may obtain the continuous packet loss state, and the core network device uses the differentiated user quality and the reliability assurance policy, to further balance the assurance effect and the radio resource consumption.

Based on the first aspect or the first implementation of the first aspect of the present disclosure, in a second implementation of the first aspect of the present disclosure, if end-to-end (E2E) time synchronization is implemented, a packet used by the receiving end device to send the continuous packet loss state carries timestamp information, where the timestamp information indicates a packet sending moment at which the receiving end device sends the continuous packet loss state.

According to a second aspect of the present disclosure, a reliability assurance method is provided, including:

An access network device receives a continuous packet loss state sent by a receiving end device, where the continuous packet loss state indicates a current packet loss state of data transmission between a transmitting end device and the receiving end device, and both the transmitting end device and the receiving end device are industrial communication terminal devices; and the receiving end device sends the continuous packet loss state to the access network device, so that the access network device adjusts differentiated scheduling and a reliability assurance policy based on the continuous packet loss state.

Based on the foregoing method, the access network device may obtain the continuous packet loss state, and the access network device uses differentiated user quality and the reliability assurance policy, to balance an assurance effect and radio resource consumption.

Based on the second aspect of the present disclosure, in a first implementation of the second aspect of the present disclosure, when the continuous packet loss state changes, the access network device may adjust a continuous packet loss state obtained after the reliability assurance policy adaptively changes.

In this embodiment, an adjustment manner is provided, to improve solution implementability.

Based on the second aspect or the first implementation of the second aspect of the present disclosure, in a second implementation of the second aspect of the present disclosure, if end-to-end (E2E) time synchronization is implemented, a packet used by the receiving end device to send the continuous packet loss state carries timestamp information, where the timestamp information indicates a packet sending moment at which the receiving end device sends the continuous packet loss state.

According to a third aspect of the present disclosure, a reliability assurance method is provided, including:

A core network device receives a continuous packet loss state sent by a receiving end device, where the continuous packet loss state indicates a current packet loss state of data transmission between a transmitting end device and the receiving end device, and both the transmitting end device and the receiving end device are industrial communication terminal devices; and the receiving end device sends the continuous packet loss state to the core network device, so that the core network device adjusts differentiated scheduling and a reliability assurance policy based on the continuous packet loss state.

Based on the foregoing method, the core network device may obtain the continuous packet loss state, and the core network device uses differentiated user quality and the reliability assurance policy, to balance an assurance effect and radio resource consumption.

Based on the third aspect of the present disclosure, in a first implementation of the third aspect of the present disclosure, when the continuous packet loss state changes, the core network device may adjust a continuous packet loss state obtained after the reliability assurance policy adaptively changes.

In this embodiment, an adjustment manner is provided, to improve solution implementability.

Based on the third aspect or the first implementation of the third aspect of the present disclosure, in a second implementation of the third aspect of the present disclosure, if end-to-end (E2E) time synchronization is implemented, a packet used by the receiving end device to send the continuous packet loss state carries timestamp information, where the timestamp information indicates a packet sending moment at which the receiving end device sends the continuous packet loss state.

According to a fourth aspect, an embodiment of the present disclosure provides an industrial communication terminal device as a receiving end device, where the device performs the method according to the first aspect and the implementations of the first aspect.

According to a fifth aspect, an embodiment of the present disclosure provides an access network device, where the device performs the method according to the first aspect and the implementations of the first aspect.

According to a sixth aspect, an embodiment of the present disclosure provides a core network device, where the device performs the method according to the first aspect and the implementations of the first aspect.

According to a seventh aspect, an embodiment of the present disclosure provides a computer storage medium. The computer storage medium stores instructions, and when the instructions are executed on a computer, the computer is enabled to perform the method according to any implementation of the first aspect to the third aspect.

According to an eighth aspect, an embodiment of the present disclosure provides a computer software product. When the computer program product is executed on a computer, the computer is enabled to perform the method according to any implementation of the first aspect to the third aspect.

DESCRIPTION OF EMBODIMENTS

The following clearly and completely describes the technical solutions in embodiments of the present disclosure with reference to the accompanying drawings in embodiments of the present disclosure. It is clear that the described embodiments are some but not all of embodiments of the present disclosure.

The technical solutions provided in embodiments of the present disclosure may be applied to various communication systems, for example, a long term evolution (LTE) system, a fifth-generation (5th generation, 5G) mobile communication system, a wireless-fidelity (Wi-Fi) system, a future communication system, or a system integrated by a plurality of communication systems. This is not limited in embodiments of the present disclosure. The 5G may also be referred to as new radio (NR).

The technical solutions provided in embodiments of the present disclosure may be applied to various communication scenarios, for example, may be applied to one or more of the following communication scenarios: an enhanced mobile broadband (eMBB), ultra-reliable low-latency communication (URLLC), machine type communication (MTC), massive machine type communication (mMTC), device-to-device (D2D), vehicle to everything (V2X), vehicle to vehicle (V2V), internet of things (, IoT), and the like.

Figures 1, 2:
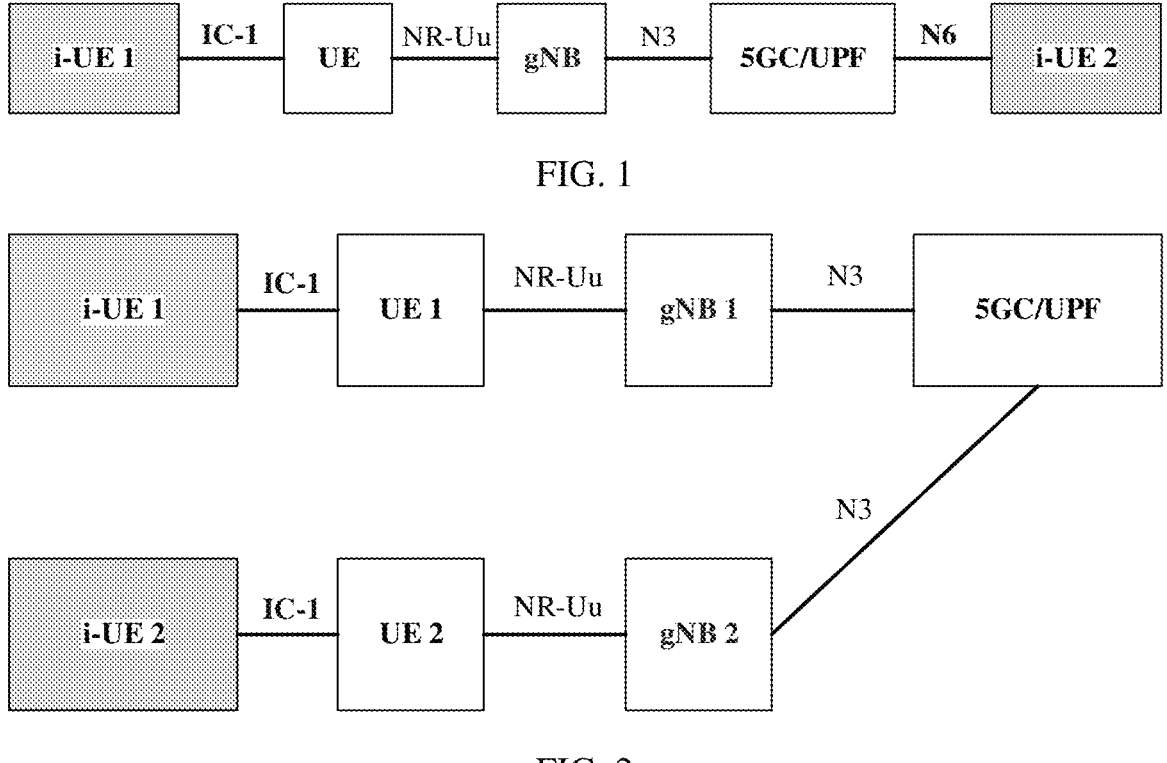
FIG. 1 is a diagram of a network framework according to an embodiment of the present disclosure.
FIG. 2 is a diagram of another network framework according to an embodiment of the present disclosure.

Refer to FIG. 1 and FIG. 2. A network framework in embodiments of the present disclosure includes:

an industrial communication terminal device, a wireless network terminal device, an access network device, and a core network device.

The industrial communication terminal device may be connected to the wireless network terminal device. For example, a first industrial communication terminal device in FIG. 1 or a third industrial communication terminal device and a fourth industrial communication terminal device in FIG. 2 each are connected to a wireless network terminal device. The wireless network terminal device is connected to the core network device by using the access network device. The industrial communication terminal device, for example, a second industrial communication terminal device in FIG. 1, may alternatively be connected to the core network device.

The industrial communication terminal device and the wireless network terminal device may be connected through an IC-1 (Industrial Communication Type1) interface. A connection manner includes a wired manner, a wireless manner, or a combination thereof. Protocol types supported by the IC-1 interface include an IP, an Ethernet, Wi-Fi, and a protocol type extended based on another industrial communication scenario. The industrial communication terminal device and the core network device may be connected through an N6 interface, and protocol types supported by the N6 interface include an IP, an Ethernet, Wi-Fi, and a protocol type extended based on another industrial communication scenario.

In this embodiment, all of a quantity of industrial communication terminal devices, a quantity of wireless network terminal devices, a quantity of access network devices, a quantity of core network devices, and the like are not limited. The network framework shown in FIG. 1 is merely used as an example for description in this embodiment.

An industrial communication user (industrial user equipment, i-UE) is an industrial communication terminal device (a terminal device that is configured to provide data connectivity at an industrial production site), for example, a PLC controller, an industrial personal computer, or an industrial server.

The wireless network terminal device, also referred to as wireless network (for example, the 3GPP) user equipment (UE), a mobile station (MS), a mobile terminal (MT), and the like, is a device that provides voice and/or data connectivity to a user, for example, a handheld device or a vehicle-mounted device that has a wireless connection function. Currently, some terminal examples are: a mobile phone, a tablet computer, a notebook computer, a laptop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in smart city, and a wireless terminal in smart home.

The core network device is a device that is in a core network (CN) and that provides service support for a terminal. Currently, some examples of the core network device are: an access and mobility management function (AMF) entity, a session management function (SMF) entity, and a user plane function (UPF) entity. Details are not described herein again. The AMF entity may be responsible for access management and mobility management of a terminal. The SMF entity may be responsible for session management, for example, session establishment of a user. The UPF entity may be a functional entity of a user plane, and is mainly responsible for connecting to an external network. It should be noted that an entity in the present disclosure may also be referred to as a network element or a functional entity. For example, the AMF entity may also be referred to as an AMF network element or an AMF functional entity. For another example, the SMF entity may also be referred to as an SMF network element or an SMF functional entity. This is not specifically limited herein.

The access network device is a radio access network (RAN) node (or device) that accesses a terminal to a wireless network, and may also be referred to as a base station. Currently, some examples of the RAN node are: a continuously evolved NodeB (gNB), a transmission reception point (TRP), an evolved NodeB (eNB), a radio network controller (RNC), a NodeB (NB), a base station controller (BSC), a base transceiver station (BTS), a home NodeB (for example, a home evolved NodeB or a home NodeB, HNB), a base band unit (BBU), or a wireless-fidelity (Wi-Fi) access point (AP).

Figure 3:
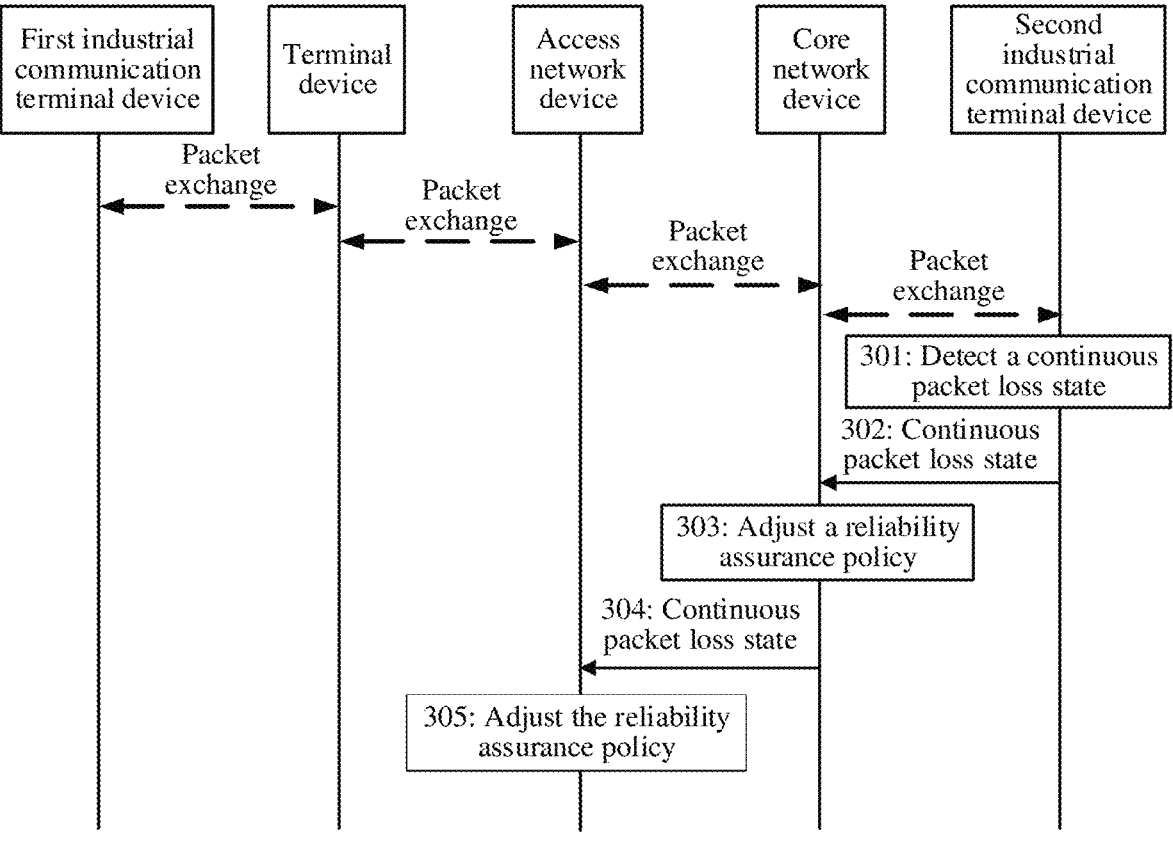
FIG. 3 is a schematic flowchart of a reliability assurance method according to an embodiment of the present disclosure.

Refer to FIG. 3. With reference to the diagram of the network framework shown in FIG. 1, one embodiment of a quality of service adjustment method in embodiments of the present disclosure includes the following steps.

301: The second industrial communication terminal device detects a continuous packet loss state.

In this embodiment, that the second industrial communication terminal device is a receiving end device and the first industrial communication terminal device is a transmitting end device is used as an example. The second industrial communication terminal device detects the continuous packet loss state, where the continuous packet loss state may be specifically that, for example, three continuous packet loss cycles occur currently (to be specific, the second industrial communication terminal device does not receive data sent by the first industrial communication terminal device for three cycles).

302: The second industrial communication terminal device sends the continuous packet loss state to the core network device.

The continuous packet loss state may be sent to the core network device by using an IP packet, or may be sent to the core network device in another form, for example, by using a MAC/Ethernet packet.

Figure 4:
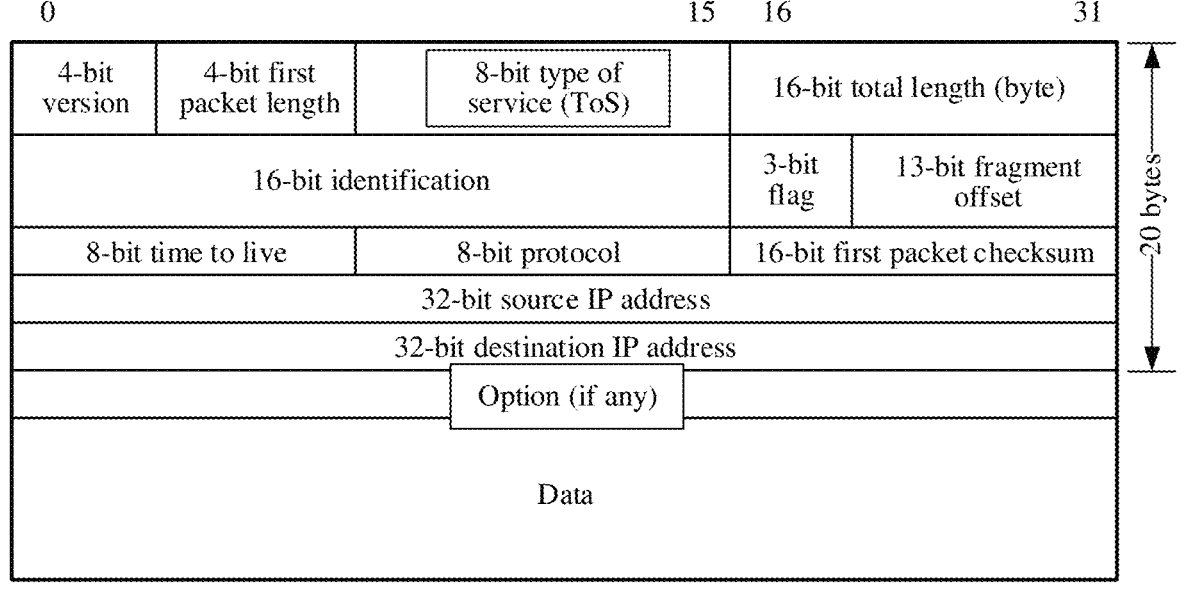
FIG. 4 is a schematic diagram of an IP packet according to an embodiment of the present disclosure.

FIG. 4 shows one example of the internet protocol (IP) packet. The continuous packet loss state may be carried in a type of service (ToS) field in a header or carried in an optional (Option) field of the packet. This is not specifically limited herein.

Figure 5:
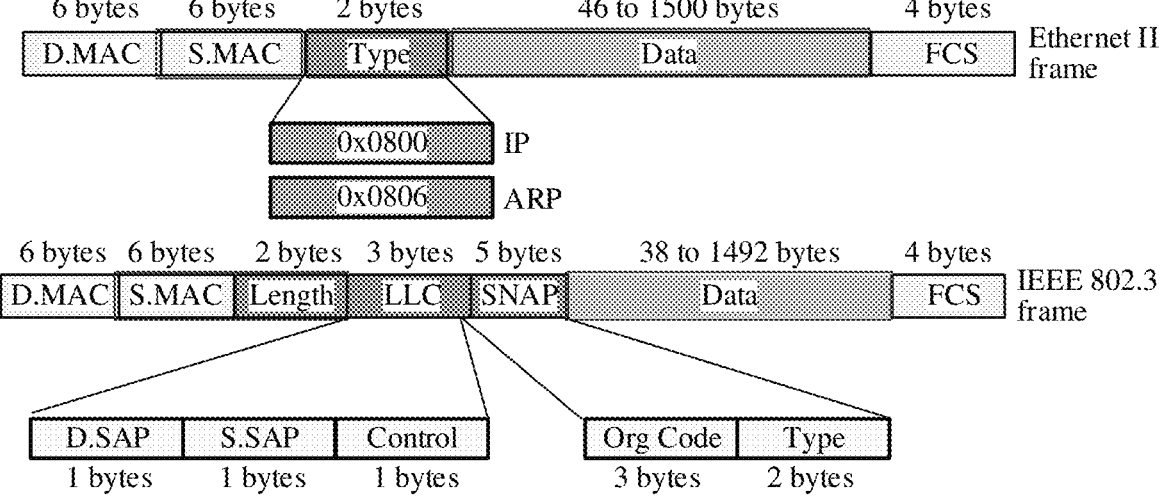
FIG. 5 is a schematic diagram of a MAC/Ethernet packet according to an embodiment of the present disclosure.

FIG. 5 shows one example of the media access control sublayer protocol (media access control, MAC)/Ethernet packet. A Payload (load and data) field may be customized, and one byte is inserted in front of or behind valid data, to indicate a continuous packet loss quantity of the second industrial communication terminal device. That is, the continuous packet loss state is carried. It may be understood that the continuous packet loss state may alternatively be carried in the MAC/Ethernet packet in another manner, for example, by using an appointed special source MAC address or by inserting one byte behind a Length field or an Ethertype field.

The second industrial communication terminal device may separately generate a packet to send the continuous packet loss state to the core network device, or the continuous packet loss state may be carried in another packet for information exchange between the second industrial communication terminal device and the core network device. This is not specifically limited herein.

303: The core network device adjusts a reliability assurance policy.

The core network device in the wireless network pre-formulates differentiated quality of service (QoS) and the reliability assurance policy based on different continuous packet loss quantities α. A specific policy is not limited herein. The following describes several feasible policies.

1. Different packet redundant sending mechanisms are used for different QoS.

2. Different scheduling priorities/priority sending mechanisms are used for different QoS.

304: The access network device obtains the continuous packet loss state.

The following two obtaining manners are available:

1. The core network device transfers the obtained continuous packet loss state to an access-side device. A transfer manner includes: The continuous packet loss state is carried in an extension header of a general packet radio service (GPRS) tunnelling protocol user plane part (GPRS tunnelling protocol user plane, GTPU) or the continuous packet loss state is transferred through separately added message exchange. The core network device directly forwards, to the access network device, the packet that is sent by the second industrial communication device and that includes continuous packet loss information.

2. The second industrial communication device directly sends the continuous packet loss state to the access network device, and the access network device performs the step performed by the core network device in the step 302.

305: The access network device adjusts the reliability assurance policy based on the continuous packet loss state.

A base station side of the wireless network pre-formulates differentiated QoS and the reliability assurance policy based on different continuous packet loss quantities α. A specific policy is not limited herein. The following describes several feasible policies.

1. Modulation and coding scheme (MCS): A device first obtains an MCS value used by an industrial communication terminal device when the QoS and the reliability assurance policy are not considered, and the MCS value is used as a maximum MCS value available to the industrial communication terminal device. When the QoS and a reliability assurance degree need to be improved, the MCS value is decreased. Otherwise, the MCS value is properly increased. A minimum MCS value is a minimum MCS value currently supported by the industrial communication terminal device, and needs to ensure that the packet is not fragmented. To be specific, the maximum MCS value (MCSmax)={a default MCS of the industrial communication terminal device}; and the minimum MCS value (MCSmin)=MAX {a minimum MCS that is supported by a wireless network user plane, a minimum MCS that ensures that the packet is not fragmented}. An adjustment range of the MCS is between the MCSmin and the MCSmax. A value of MAX {A, B} is a larger value in A and B.

2. Scheduling priority scheme: A lowest scheduling priority is a default scheduling priority of an industrial communication terminal device; and a highest priority is a highest scheduling priority that can be used by the industrial communication terminal device. Alternatively, a weight β of the continuous packet loss quantity may be considered to be set, and a packet with a larger packet loss quantity has a higher priority and vice versa.

3. Scheduling grant scheme: In an uplink scheduling scenario, when the QoS and the reliability assurance policy need to be improved, a policy, for example, pre-scheduling or Grant-Free, may be used for the packet of the user, to ensure an uplink scheduling assurance effect.

When the continuous packet loss state changes and/or a packet loss quantity indicated by the continuous packet loss state reaches a preset threshold, the core network device may adjust the reliability assurance policy.

An adjustment manner may be that whether a continuous packet loss quantity increases or decreases is determined. If the quantity increases, the QoS and a reliability assurance mechanism of the packet of the first industrial communication terminal device are matched and improved based on a changed quantity. If the quantity decreases, the QoS and a reliability assurance mechanism of the packet of the first industrial communication terminal device are matched and reduced based on a changed quantity.

In this embodiment, the adjustment manner in which the core network device adjusts the reliability assurance policy is not limited. For example, the adjustment manner may alternatively include: setting a highest threshold and a lowest threshold; and when the continuous packet loss state is lower than or equal to the lowest threshold, reducing the QoS and the reliability assurance mechanism of the packet of the first industrial communication terminal device: or when the continuous packet loss state is higher than or equal to the highest threshold, improving the QoS and the reliability assurance mechanism of the packet of the first industrial communication terminal device. The lowest threshold and the highest threshold may be determined based on an actual case, for example, the lowest threshold is 0 and the highest threshold is 3.

In this embodiment, there is no time sequence relationship between both of the steps 302 and 303 and both of the steps 304 and 305, and the step 302 and the step 303 may not be performed.

On a basis that end-to-end (E2E) time synchronization is already implemented, a timestamp may be added to implement reliability assurance with higher precise. The E2E time synchronization means that time synchronization is implemented at each node from the industrial communication terminal device to a 3GPP system (including the wireless network terminal device, the access network device, and the core network device).

Figure 6:
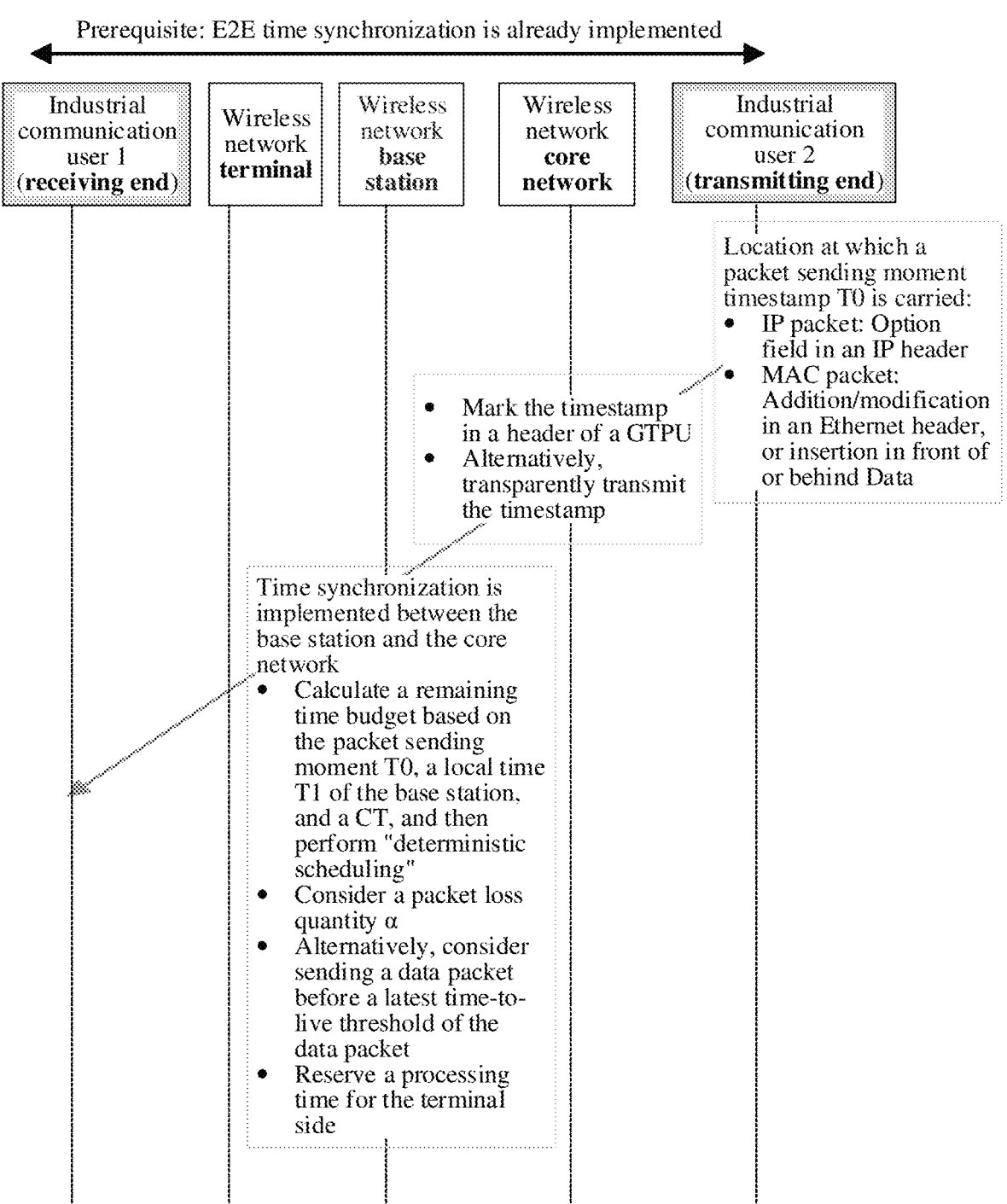
FIG. 6 is a schematic flowchart of implementing end-to-end time synchronization according to an embodiment of the present disclosure.

Refer to FIG. 6. A downlink packet sending scenario is used as an example. A sequence of an industrial communication packet is as follows: the first industrial communication terminal device (a transmitting end)→the core network device→the access network device→a terminal device→the second industrial communication terminal device (a receiving end).

There are a plurality of timestamp marking manners. The following are examples.

Manner 1: The industrial communication terminal device (i-UE) marks a timestamp, and then sends the timestamp to the core network device. Timestamp mark transfer may be performed at the core network device, then the timestamp is marked in a header of a GTPU packet, and the access network device is notified. Alternatively, the access network device may obtain the timestamp through parsing.

Manner 2: When a time difference between the core network device and the transmitting end is less than y milliseconds (y>0), it may alternatively be considered that a timestamp is marked at the core network device.

After receiving an industrial protocol packet, the access network device obtains an initial sending time T0 of the transmitting end by using a timestamp of the packet, compares the initial sending time T0 with a local time T1 of the access network device, and executes a deterministic scheduling mechanism with reference to a packet sending cycle CycleTime.

The access network device obtains a remaining sending time budget ($\Delta t$=CycleTime–T1+T0) of the packet, and sends the packet at a given success rate within $\Delta t$ by using the deterministic scheduling mechanism. In actual operation, a processing time may be considered to be reserved for the terminal device.

Based on the foregoing solutions, a current continuous packet loss quantity a is considered. When downlink packet scheduling is performed, both of performing deterministic scheduling within the remaining sending time budget and differentiating an assurance means based on a are considered.

A maximum packet loss quantity N, the sending cycle CycleTime, the base station-side time T1, and the transmitting end time T0 are considered to obtain a latest sending time threshold of a data packet: Td=(N–1)*CycleTime–T1+T0. It is strictly ensured, by using the deterministic scheduling mechanism, that the data packet is successfully sent before Td. A processing time may be considered to be reserved for the terminal device.

The current continuous packet loss quantity a is considered. When downlink packet scheduling is performed, both of performing deterministic scheduling within the latest sending time threshold and differentiating an assurance means based on a may be considered.

On a basis of E2E time synchronization, a precise remaining time budget is obtained through timestamp marking. Therefore, differentiated QoS and reliability assurance of the continuous packet loss state in a downlink transmission process of industrial communication are implemented.

Figure 7:
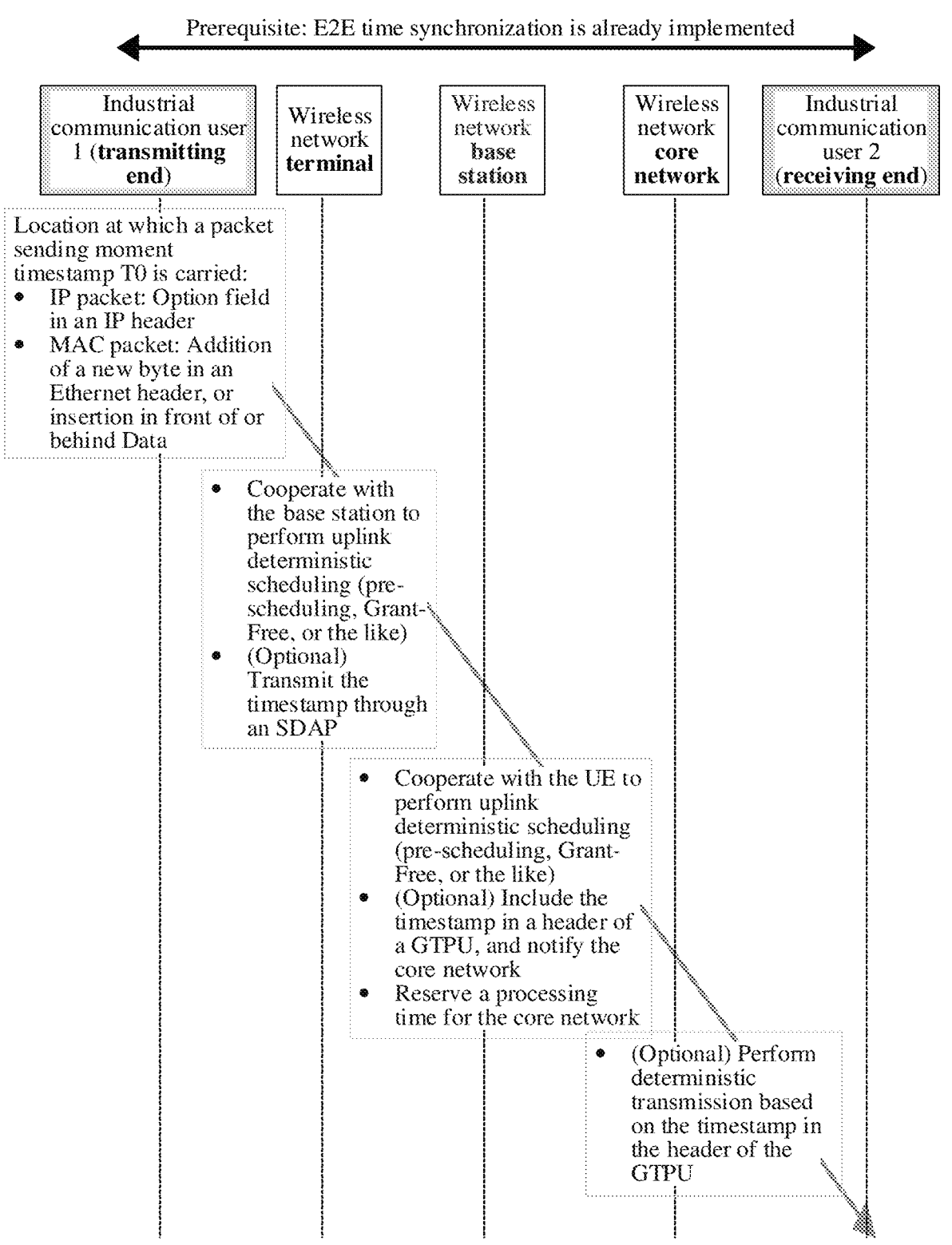
FIG. 7 is another schematic flowchart of implementing end-to-end time synchronization according to an embodiment of the present disclosure.

Refer to FIG. 7. An uplink packet sending scenario is used as an example. A sequence of an industrial communication packet is as follows: a first industrial communication user (a transmitting end)→a terminal device→the access network device→the core network device→a second industrial communication user (a receiving end). Content included in timestamp information is similar to that in the embodiment shown in FIG. 6. Details are not described herein again.

After receiving an industrial protocol packet, the terminal device obtains an initial sending time T0 of the transmitting end by using a timestamp of the packet, compares the initial sending time T0 with a local time T1 of UE, and executes an uplink deterministic scheduling mechanism with a base station with reference to a packet sending cycle CycleTime.

The terminal device obtains a remaining sending time budget ($\Delta t$=CycleTime–T1+T0) of the packet, and cooperates with the base station to send the packet at a given success rate within $\Delta t$ by using the deterministic scheduling mechanism (pre-scheduling, Grant-Free, or the like). A processing time may be considered to be reserved for the core network device.

A current continuous packet loss quantity a is considered. When uplink packet scheduling is performed, both of performing deterministic scheduling within the remaining sending time budget and differentiating an assurance means based on a are considered. Different a corresponds to different pre-scheduling/Grant-Free parameters, and may be used as inputs of a logical channel priority (LCP). The parameters may be pre-configured or temporarily adjusted. This is not limited herein.

A maximum packet loss quantity N, the sending cycle CycleTime, the base station-side time T1, and the transmitting end time T0 are considered to obtain a latest sending time threshold of a data packet: Td=(N–1)*CycleTime-T1+T0. The terminal device cooperates with the base station to strictly ensure, by using the deterministic scheduling mechanism (pre-scheduling, Grant-Free, or the like), that the data packet is successfully sent before Td. A processing time may be considered to be reserved for the core network device.

The continuous packet loss quantity a is considered. When uplink packet scheduling is performed, both of performing deterministic scheduling within the latest sending time threshold and differentiating an assurance means based on a are considered. Different a corresponds to different pre-scheduling/Grant-Free parameters, and may be used as inputs of an LCP. The parameters may be pre-configured or temporarily adjusted. This is not limited herein.

On a basis of E2E time synchronization, a precise remaining time budget is obtained through timestamp marking. Therefore, differentiated QoS and reliability assurance of the continuous packet loss state in an uplink transmission process of industrial communication are implemented.

Figure 8:
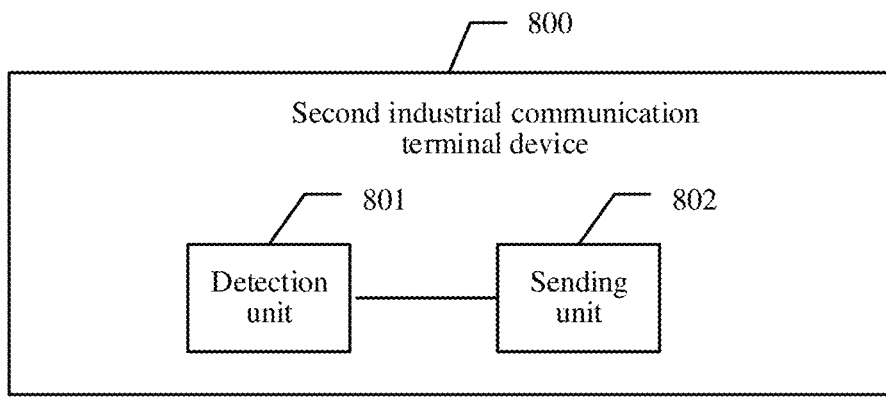
FIG. 8 is a schematic diagram of a structure of a second industrial communication terminal device according to an embodiment of the present disclosure.

FIG. 8 shows an industrial communication terminal device according to an embodiment of the present disclosure. The industrial communication terminal device serves as a receiving end device (a second industrial communication terminal device), and one embodiment of the second industrial communication terminal device 800 includes:

a detection unit 801, configured to detect a continuous packet loss state; and a sending unit 802, configured to send the continuous packet loss state to an access network device, and further configured to send the continuous packet loss state to a core network device, where if end-to-end (E2E) time synchronization is implemented, a packet used to send the continuous packet loss state carries timestamp information.

In this embodiment, operations performed by the units in the second industrial communication terminal device 800 are similar to those described in the embodiment shown in FIG. 3. Details are not described herein again.

Figure 9:
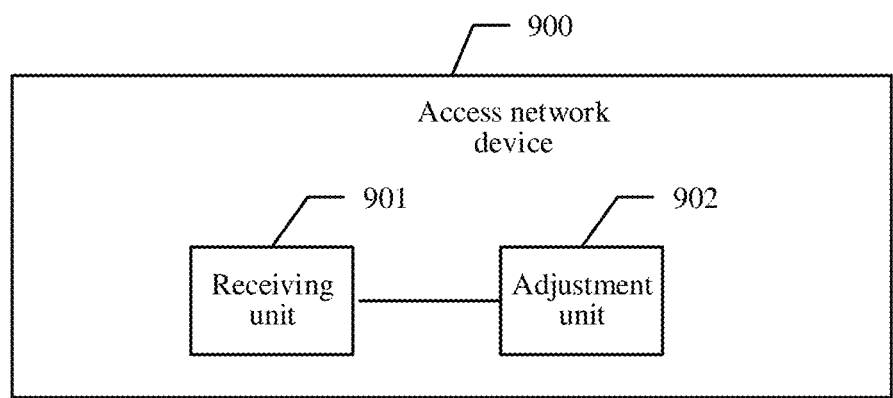
FIG. 9 is a schematic diagram of a structure of an access network device according to an embodiment of the present disclosure.

Refer to FIG. 9. One embodiment of an access network device 900 in embodiments of the present disclosure includes:

a receiving unit 901, configured to receive a continuous packet loss state sent by a receiving end device; and an adjustment unit 902, configured to adjust a reliability assurance policy based on the continuous packet loss state, and further configured to: when the continuous packet loss state changes, adjust a continuous packet loss state obtained after the reliability assurance policy adaptively changes.

In this embodiment, operations performed by the units in the access network device 900 are similar to those described in the embodiment shown in FIG. 3. Details are not described herein again.

Figure 10:
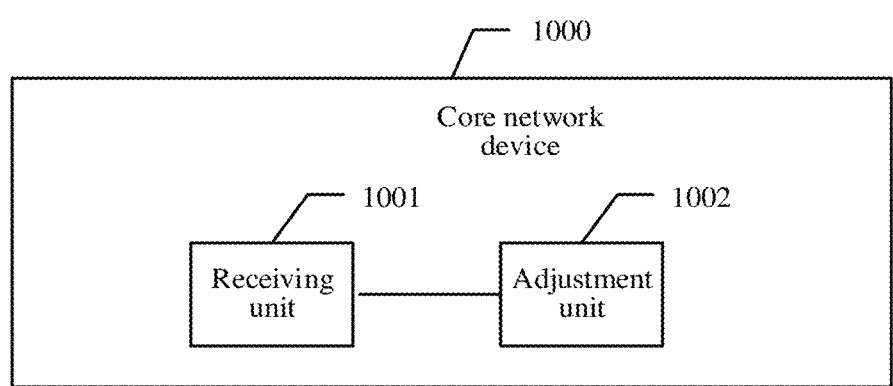
FIG. 10 is a schematic diagram of a structure of a core network device according to an embodiment of the present disclosure.

Refer to FIG. 10. One embodiment of a core network device 1000 in embodiments of the present disclosure includes:

a receiving unit 1001, configured to receive a continuous packet loss state sent by a receiving end device; and an adjustment unit 1002, configured to adjust a reliability assurance policy based on the continuous packet loss state, and further configured to: when the continuous packet loss state changes, adjust a continuous packet loss state obtained after the reliability assurance policy adaptively changes.

In this embodiment, operations performed by the units in the core network device 1000 are similar to those described in the embodiment shown in FIG. 3. Details are not described herein again.

Figure 11:
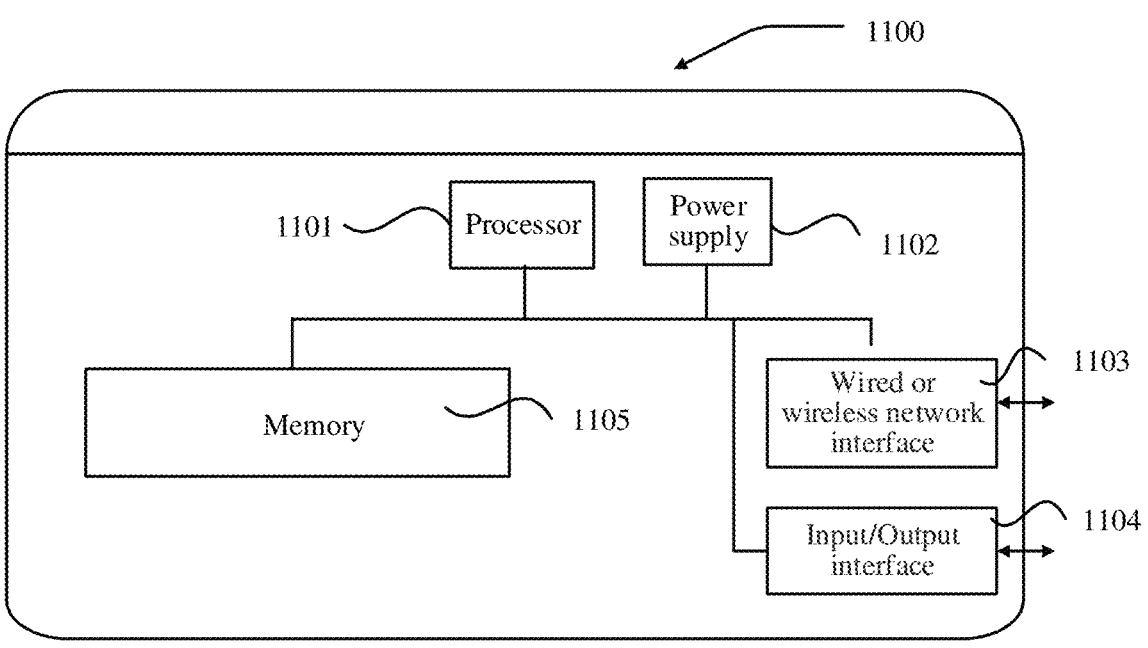
FIG. 11 is a schematic diagram of another structure of an access network device according to an embodiment of the present disclosure.

FIG. 11 is a schematic diagram of a structure of an access network device according to an embodiment of the present disclosure. The access network device 1100 may include one or more processors 1101 and a memory 1105, and the memory 1105 stores one or more applications or data.

The memory 1105 may be a volatile storage or a persistent storage. A program stored in the memory 1105 may include one or more modules, and each module may include a series of instruction operations for the access network device 1100. Further, the processor 1101 may be disposed to communicate with the memory 1105, and perform a series of instruction operations in the memory 1105 on the access network device 1100.

The access network device 1100 may further include one or more power supplies 1102, one or more wired or wireless network interfaces 1103, one or more input/output interfaces 1104, and/or one or more operating systems, for example, any one of a Microsoft operating system (Windows), an Android operating system (Android), an Apple operating system (Mac OS), a Unix operating system (Unix), and a Linux operating system (Linux).

The processor 1101 may perform the operations performed by the access network device in any one of the foregoing embodiments. Details are not specifically described herein again.

Figure 12:
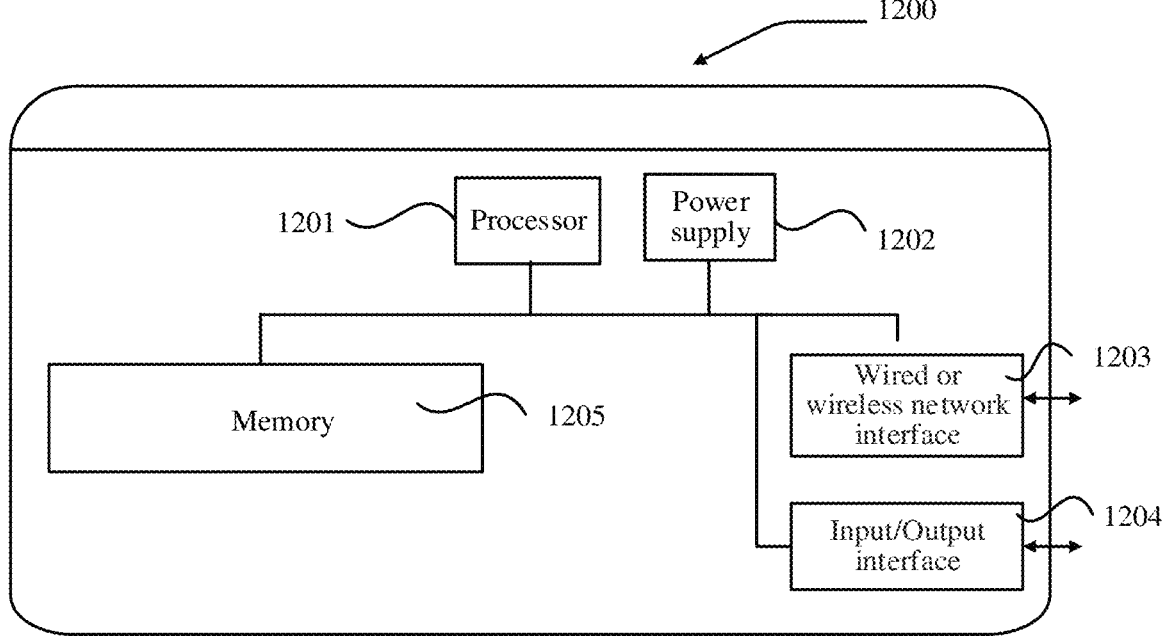
FIG. 12 is a schematic diagram of another structure of a core network device according to an embodiment of the present disclosure.

FIG. 12 is a schematic diagram of a structure of a core network device according to an embodiment of the present disclosure. The core network device 1200 may include one or more processors 1201 and a memory 1205, and the memory 1205 stores one or more applications or data.

The memory 1205 may be a volatile storage or a persistent storage. A program stored in the memory 1205 may include one or more modules, and each module may include a series of instruction operations for the core network device 1200. Further, the processor 1201 may be disposed to communicate with the memory 1205, and perform a series of instruction operations in the memory 1205 on the core network device 1200.

The core network device 1200 may further include one or more power supplies 1202, one or more wired or wireless network interfaces 1203, one or more input/output interfaces 1204, and/or one or more operating systems, for example, any one of a Microsoft operating system (Windows), an Android operating system (Android), an Apple operating system (Mac OS), a Unix operating system (Unix), and a Linux operating system (Linux).

The processor 1201 may perform the operations performed by the core network device in any one of the foregoing embodiments. Details are not specifically described herein again.

Figure 13:
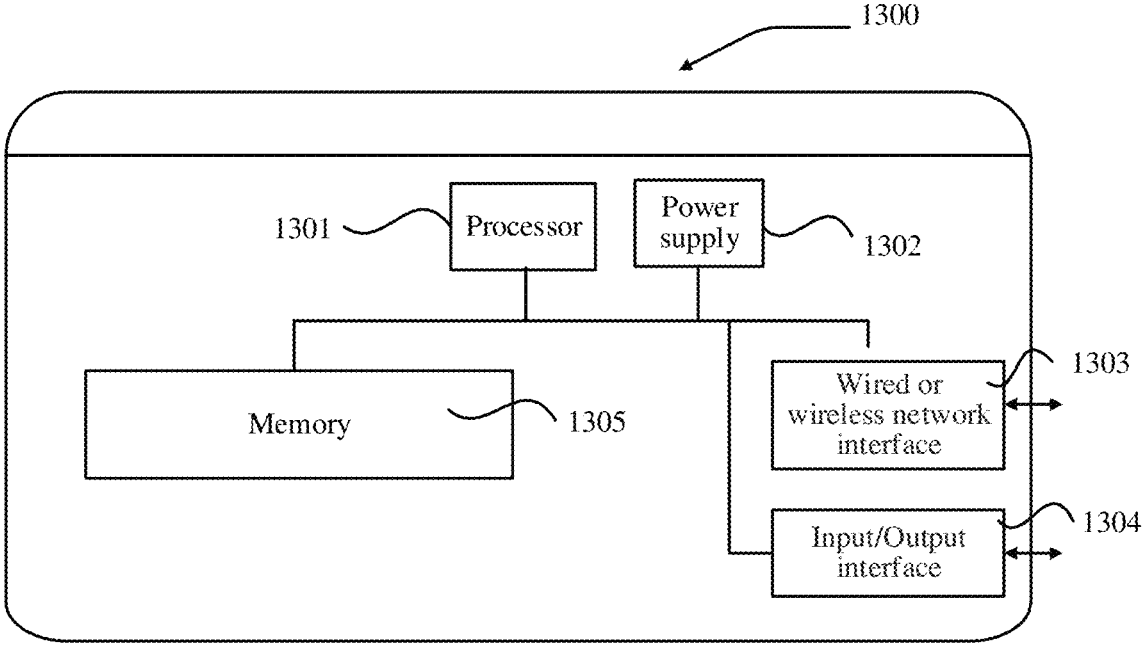
FIG. 13 is a schematic diagram of another structure of a second industrial communication terminal device according to an embodiment of the present disclosure.

FIG. 13 is a schematic diagram of a structure of an industrial communication terminal device according to an embodiment of the present disclosure. The industrial communication terminal device serves as a receiving end device (a second industrial communication terminal device). The second industrial communication terminal device 1300 may include one or more processors 1301 and a memory 1305, and the memory 1305 stores one or more applications or data.

The memory 1305 may be a volatile storage or a persistent storage. A program stored in the memory 1305 may include one or more modules, and each module may include a series of instruction operations for the second industrial communication terminal device 1300. Further, the processor 1301 may be disposed to communicate with the memory 1305, and perform a series of instruction operations in the memory 1305 on the second industrial communication terminal device 1300.

The second industrial communication terminal device 1300 may further include one or more power supplies 1302, one or more wired or wireless network interfaces 1303, one or more input/output interfaces 1304, and/or one or more operating systems, for example, any one of a Microsoft operating system (Windows), an Android operating system (Android), an Apple operating system (Mac OS), a Unix operating system (Unix), and a Linux operating system (Linux).

The one or more processors 1301 may perform the operations performed by the second industrial communication terminal device in any one of the foregoing embodiments. Details are not specifically described herein again.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in the present disclosure, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate. Parts displayed as units may or may not be physical units, to be specific, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the method described in embodiments of the present disclosure. The foregoing storage medium includes any medium that can store program code, such as a USB flash drive, a removable hard disk, a read-only memory (ROM), a random access memory (RAM), a magnetic disk, or an optical disc.

What is claimed is:

1. A reliability assurance method, comprising:

detecting, by a receiving end device, a continuous packet loss state, wherein the continuous packet loss state indicates a state in which data packets transmitted from a transmitting end device to the receiving end device are not received over a period of time or at least one cycle, and both the transmitting end device and the receiving end device are industrial communication terminal devices; and sending, by the receiving end device, the continuous packet loss state to an access network device, wherein the continuous packet loss state is indicated by a type of service (ToS) field in a header of a packet used by the receiving end device to send the continuous packet loss state, and wherein when end-to-end (E2E) time synchronization is implemented, a packet used by the receiving end device to send the continuous packet loss state carries timestamp information indicating a packet sending moment at which the receiving end device sends the continuous packet loss state to the access network device or a core network device.

2. The method according to claim 1, wherein after the detecting, by a receiving end device, a continuous packet loss state, the method further comprises:

sending, by the receiving end device, the continuous packet loss state to a core network device.

3. A receiving end device, comprising:

at least one processor; and one or more memories including computer instructions that, when executed by the at least one processor, cause the receiving end device to perform operations comprising:

detecting a continuous packet loss state, wherein the continuous packet loss state indicates a state in which data packets transmitted from a transmitting end device to the receiving end device are not received over a period of time or at least one cycle, and both the transmitting end device and the receiving end device are industrial communication terminal devices; and sending the continuous packet loss state to an access network device, wherein the continuous packet loss state is indicated by a type of service (ToS) field in a header of a packet used by the receiving end device to send the continuous packet loss state, and wherein when end-to-end (E2E) time synchronization is implemented, a packet used by the receiving end device to send the continuous packet loss state carries timestamp information indicating a packet sending moment at which the receiving end device sends the continuous packet loss state to the access network device or a core network device.

4. The receiving end device according to claim 3, wherein the operations further comprise:

after the detecting the continuous packet loss state, sending the continuous packet loss state to a core network device.

5. An access network device, comprising:

at least one processor; and one or more memories including computer instructions that, when executed by the at least one processor, cause the access network device to perform operations comprising:

receiving a continuous packet loss state sent by a receiving end device, wherein the continuous packet loss state indicates a state in which data packets transmitted from a transmitting end device to the receiving end device are not received over a period of time or at least one cycle, and both the transmitting end device and the receiving end device are industrial communication terminal devices; and adjusting a reliability assurance policy based on the continuous packet loss state, wherein the continuous packet loss state is indicated by a type of service (ToS) field in a header of a packet sent by the receiving end device, and wherein when end-to-end (E2E) time synchronization is implemented, a packet used by the receiving end device to send the continuous packet loss state carries timestamp information indicating a packet sending moment at which the receiving end device sends the continuous packet loss state to the access network device.

6. The access network device according to claim 5, wherein the adjusting the reliability assurance policy based on the continuous packet loss state comprises:

when the continuous packet loss state changes, adjusting a continuous packet loss state obtained after the reliability assurance policy adaptively changes.

7. The method according to claim 1, wherein the packet used by the receiving end device to send the continuous packet loss state is a MAC/Ethernet packet.

8. The access network device according to claim 5, wherein the packet that includes the type of service (ToS) field indicating the continuous packet loss state is carried using a general packet radio service (GPRS) tunnelling protocol user plane part (GTPU).

9. The access network device according to claim 5, wherein the continuous packet loss state is transferred through separately added message exchange.

10. The access network device according to claim 5, wherein the adjusting the reliability assurance policy based on the continuous packet loss state comprises:

when a packet loss quantity indicated by the continuous packet loss state reaches a threshold, adjusting the reliability assurance policy according to the packet loss quantity.

11. The method according to claim 1, wherein the continuous packet loss state indicates a packet loss quantity.

12. The method according to claim 1, wherein the continuous packet loss state indicates that the receiving end device does not receive data sent by the transmitting end device for a number of consecutive cycles.

* * * * *